(12) United States Patent
Morris

(10) Patent No.: US 7,735,516 B2
(45) Date of Patent: Jun. 15, 2010

(54) LIFT AXLE CONTROL MODULE

(75) Inventor: John M. Morris, Auburn, WA (US)

(73) Assignee: Norgren GT Development Corporation, Auburn, WA (US)

( * ) Notice: Subject to any disclaimer, the term of this patent is extended or adjusted under 35 U.S.C. 154(b) by 825 days.

(21) Appl. No.: 11/623,005

(22) Filed: Jan. 12, 2007

(65) Prior Publication Data
US 2007/0277886 A1 Dec. 6, 2007

Related U.S. Application Data

(60) Provisional application No. 60/800,808, filed on May 16, 2006.

(51) Int. Cl.
*F15B 13/04* (2006.01)
(52) U.S. Cl. .............................. 137/596.15; 137/596.1; 137/596.2; 280/86.5; 91/457
(58) Field of Classification Search ............ 137/596.15, 137/596.1, 596.2; 280/43.17, 43.23, 86.5, 280/124.16; 180/24.02; 91/457
See application file for complete search history.

(56) References Cited

U.S. PATENT DOCUMENTS

| | | | | |
|---|---|---|---|---|
| 4,944,526 A | * | 7/1990 | Eberling | 280/86.5 |
| 5,973,274 A | * | 10/1999 | Zarchy | 177/132 |
| 6,554,026 B1 | * | 4/2003 | Focke et al. | 137/596.15 |
| 6,572,124 B2 | * | 6/2003 | Mlsna et al. | 280/86.5 |
| 6,810,982 B2 | * | 11/2004 | Kuhn et al. | 280/86.5 |
| 7,416,190 B2 | * | 8/2008 | Sandbulte et al. | 280/124.16 |
| 2003/0111810 A1 | * | 6/2003 | Fulton et al. | 280/86.5 |
| 2003/0151222 A1 | * | 8/2003 | Sutton et al. | 280/86.5 |

FOREIGN PATENT DOCUMENTS

DE 4319943 C1 * 8/1994

\* cited by examiner

*Primary Examiner*—John Rivell
*Assistant Examiner*—Craig Price
(74) *Attorney, Agent, or Firm*—The Ollila Law Group LLC

(57) ABSTRACT

A lift axle control module is disclosed that is simpler than prior art lift axle control systems, and does not require cycling the input pressure to the regulator. The module includes a housing fluidly connected to a first pressurized air supply and having one chamber with a load bladder port, a second chamber with a lift bladder port, and a common vent port. A pilot pressure is selectively provided for switching the module between the retracted and deployed modes. When the control module is set to the retracted mode, the lift bladders are pressurized to the system pressure, and the load bladders are vented. When the control module is set to the deployed mode, the lift bladders are vented and the load bladders are inflated and maintained at the regulated pressure.

20 Claims, 10 Drawing Sheets

LIFT AXLE CONTROL MODULE

CROSS-REFERENCE TO RELATED APPLICATION

This application claims the benefit of U.S. Provisional Application No. 60/800,808, filed May 16, 2006, the disclosure of which is hereby expressly incorporated by reference in its entirety, and priority from the filing date of which is hereby claimed under 35 U.S.C. §119.

TECHNICAL FIELD

This disclosure relates generally to suspension systems of heavy-duty wheeled vehicles such as tractor-trailer trucks, and more particularly, to controls for deploying and retracting a lift axle.

BACKGROUND

Some heavy-duty vehicles, such as tractor-trailer trucks, utilize suspension systems that include an axle that can be selectively raised and lowered with respect to the undercarriage of the vehicle. An axle capable of being raised and lowered is commonly known in the industry as a lift axle. When the lift axle is lowered, or deployed, its wheels contact a road or other ground surface. In its lowered position, the lift axle assists the non-lift axles, known as primary axles, in bearing a portion of the vehicle or load weight. Distributing this weight across the additional axle may allow a vehicle to meet weight restrictions such as maximum weight per axle.

When the lift axle is lifted, or retracted, its wheels disengage from the road or other ground surface and no longer assist in the bearing of weight. When the load weight of the vehicle is less than the load capacity of the primary axles, the lift axle suspension may be raised to avoid extra wear on the lift axle and tires. Operating the vehicle with the lift axle suspension raised can also improve fuel economy, traction, and maneuverability. In addition, when the trailer is driven in reverse, the positive castor angle of the lift axle wheels may hinder self-steering and cause excess wear to the tires. Raising the lift axle disengages the wheels from the ground, thereby avoiding these issues.

A typical, conventional lift axle control system 900 is shown in FIG. 10. This prior art system includes a pressurized air tank 904 that provides air at the system pressure. A master valve 912 is provided between the system-pressurized air from the air tank 904 and a regulator 906. The regulator 906 is adjustable, to permit the user to set the regulated air pressure to a desired value, for example to accommodate the anticipated load and/or driving conditions. A second supply air output 905 fluidly connects the components to the system-pressurized air tank 904. As will be appreciated by persons of skill in the art, in FIG. 10 the character "S" indicates an air source connection to the associated component, the character "C" indicates a lower-pressure control or pilot air connection to the associated component, and the character "D" indicates a delivery side connection.

When the valve 912 is set to an open position, opening a fluid path to the regulator 906, the regulator 906 provides a control air pressure to a first regulated relay 901. The first regulator relay 901 inflates load bladders 918 until the load bladders 918 are at the control air pressure determined by the regulator 906. A second regulated relay 902 connects to the lift bladders 920 through an inverter valve 903, such that the lift bladders 920 are vented when the valve 912 is set to the open position. When the valve 912 is set to the closed position, closing the fluid path to the regulator 906, the first regulated relay 901 vents the load bladders 918, and the inverter valve 903 transmits a control pressure to the second regulated relay 902, such that the lift bladders 920 are inflated to the control pressure. Such prior art systems are relatively complicated, requiring two regulated relays and an inverter valve. It would be advantageous to provide a simpler pneumatic lift axle control system, that is easier and less-expensive to manufacture, and more reliable.

In addition, such prior art systems require cycling the regulator 906 on the supply side, which is hard on the regulator, and can result in premature failure of the system and/or the need for a more expensive and rugged regulator. It would therefore also be advantageous to provide a lift axle control system that does not require cycling the supply side pressure on the regulator 906 when switching between lift axle deployment or load operation, and retracted operation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A lift axle control module is disclosed wherein the control module controls both the pressure supplied to the load bladders and the pressure supplied to the lift bladders. In the disclosed embodiment, when the control module is in deployed mode the load bladders are maintained at a regulated pressure determined by the regulator, and the lift bags are vented. When the control module is in the retracted mode, the lift bladders are pressurized to the system pressure, and the load bladders are vented.

The control module constructed in accordance with one embodiment of the present disclosure includes a housing fluidly connected to a first pressurized air supply and having one chamber with a set of load bladder ports, a second chamber with a set of lift bladder ports, and a common vent port. Each of the chambers include a brake-style piston diaphragm that moves the integral valve members according to the mode setting. In a current embodiment, the module includes an optional, integral solenoid valve that is switchable between a non-energized position and an energized position, that is connected to a regulated air supply. When the module is in the retracted position, the load bladder port is fluidly connected to the common vent port and the lift bladder port is fluidly connected to the first pressurized air supply. When the module is in the deployed position, the load bladder port is maintained at a regulated pressure, which is typically adjustable, and the lift bladder port is fluidly connected to the common vent port. Because the regulator provides a constant regulated pressure to the lift axle control module, the input or supply side pressure to the regulator does not cycle when switching between the deployed and retracted modes.

DESCRIPTION OF THE DRAWINGS

The foregoing aspects and many of the attendant advantages of this disclosure will become better understood by reference to the following detailed description, when taken in conjunction with the accompanying drawings, wherein.

DETAILED DESCRIPTION

Figure 1:
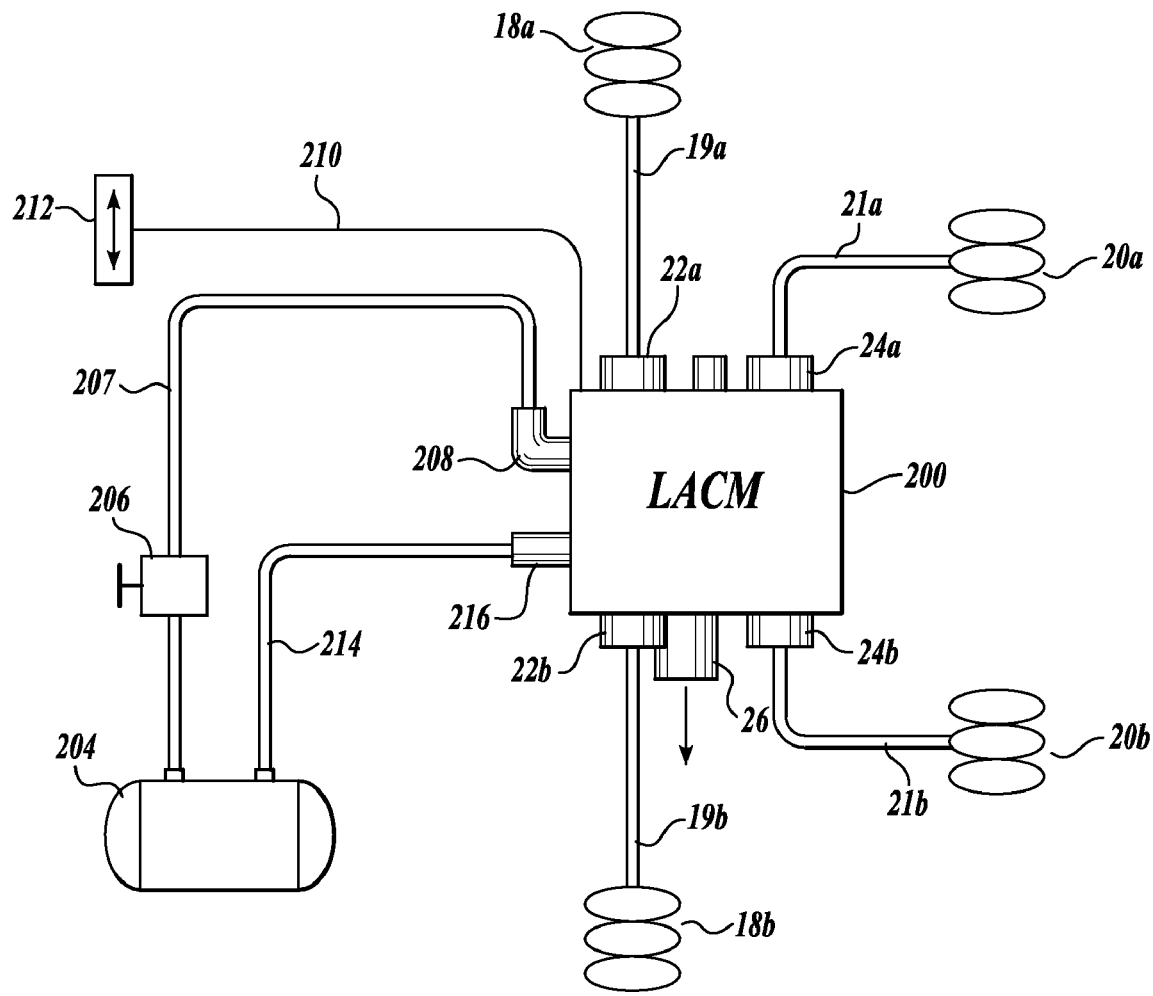
FIG. 1 is a schematic drawing of a lift axle suspension system incorporating a lift axle control module according to one embodiment of the present disclosure.

A lift axle control module 200 constructed in accordance with the present invention will now be described, by referring to FIGS. 1-9. As shown in FIG. 1, the lift axle control module 200 includes an electrical connection 210 to a switch 212 located in the cab of the vehicle or at another driver-accessible location. A regulated air supply port 208 of the lift axle control module 200 is pneumatically connected to an air tank 204 through regulated air supply line 207. A regulator valve or regulator 206 is interposed between the air tank 204 and the regulated air supply port 208 and regulates air flow through the regulated air supply line 207. A pressurized air supply line 214 fluidly connects the air tank 204 to a system-pressure air supply port 216 of the lift axle control module 200. Both the regulated air supply port 208 and the system-pressure air supply port 216 are fluidly connected to the same pressurized air tank, as shown in FIG. 1, although it is contemplated they may alternatively connect to different air supply tanks. A common vent port 26 is provided for venting to the atmosphere.

The lift axle control module 200 has load bladder ports 22a, 22b that are fluidly connected to load bladders 18a, 18b by conduits 19a, 19b, respectively. Load bladders 18a, 18b may be load air springs, also called load bags, that aid in the suspension of the lift axle assembly when the lift axle assembly (not shown) is set in the deployed position. Similarly, the lift axle control module 200 has lift bladder ports 24a, 24a that are fluidly connected to lift bladders 20a, 20b by conduits 21a, 21b, respectively. Lift bladders 20a, 20b may be lift air springs, also called lift bags, that are operable to move the lift axle assembly between the retracted and deployed positions.

It will be appreciated from FIG. 1 that unlike the prior art lift axle control system described above, the present system does not cycle the input pressure to the regulator 206 when transitioning between the deployed and retracted modes. Rather, the regulator 206 remains connected to the system pressure in the air tank 204, thereby reducing the physical stressors during operation.

Figure 2:
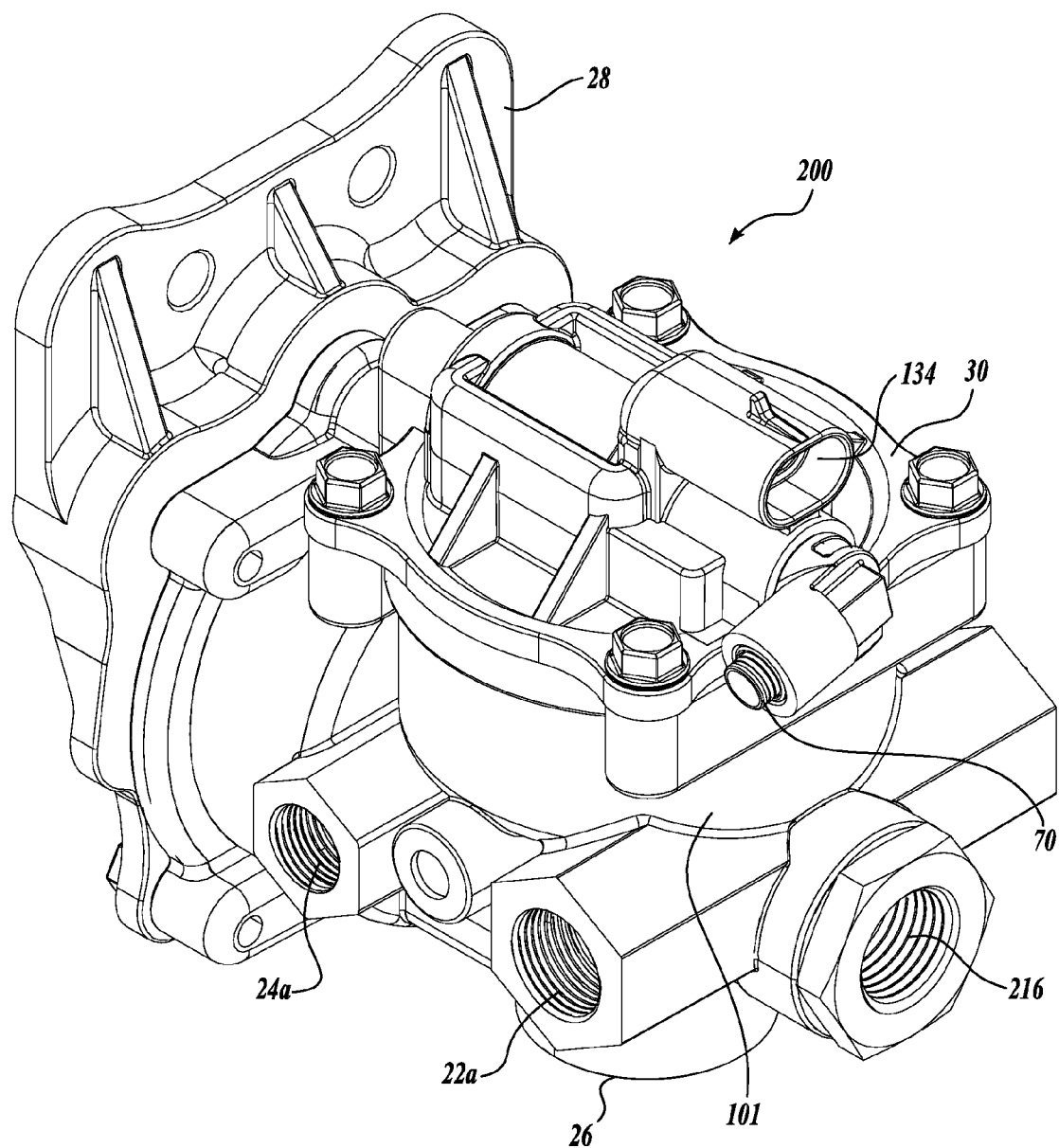
FIG. 2 is a perspective view of an embodiment of a lift axle control module according to one embodiment of the present disclosure.
Figure 3:
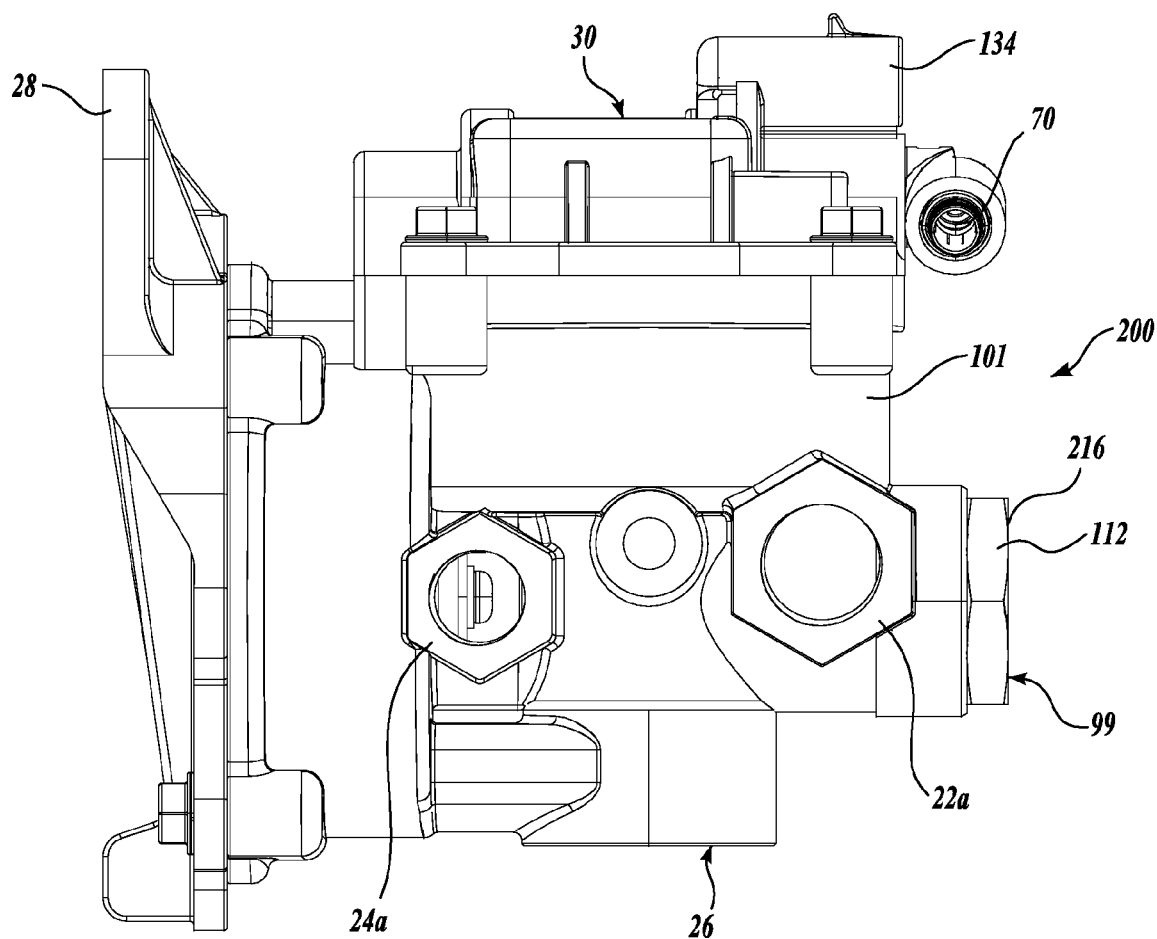
FIG. 3 is an elevational side view of the lift axle control module according to one embodiment of the present disclosure.

Referring now to FIGS. 2 and 3, which show a perspective view and a side view of the exemplary lift axle control module 200. The control module 200 includes a housing 101, a solenoid cover 30, and a mounting bracket 28. The housing 101 includes two pairs of oppositely facing ports: load bladder ports 22a, 22b and lift bladder ports 24a, 24a (one of each is visible in FIGS. 2 and 3). The system-pressure air supply port 216 extends from the control module 200 front and the common vent port 26 opens downwardly at the module 200 bottom.

Figure 4:
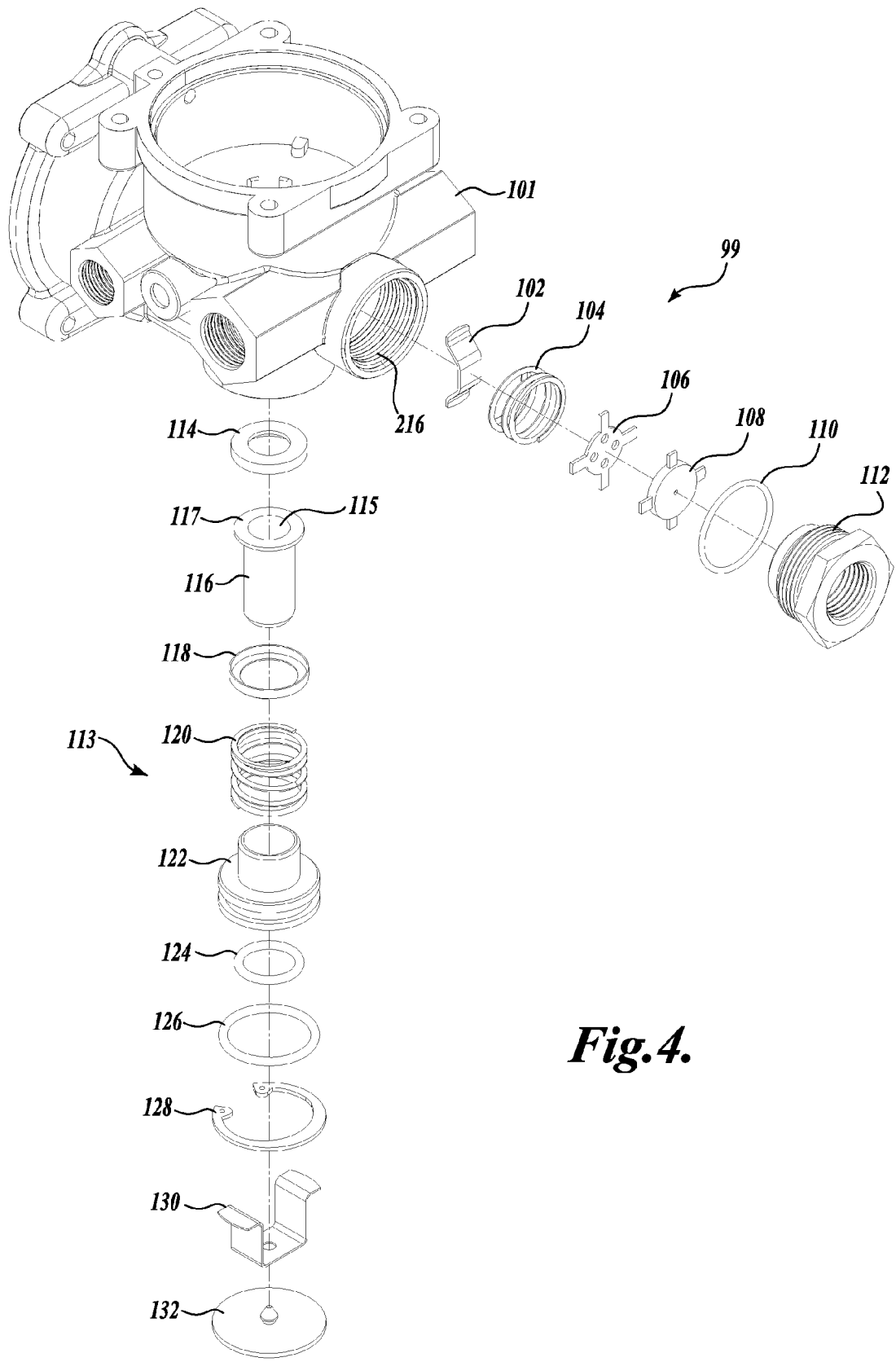
FIG. 4 is a partial exploded view of the inlet valve assembly and the check valve assembly of the lift axle control module according to one embodiment of the present disclosure.

FIG. 4 is a partial exploded view of a portion of the lift axle control module 200, showing the components of an inlet valve 113 disposed in the common vent port 26, and a check valve 99 disposed in the system-pressure air supply port 216. The inlet valve 113 comprises a valve body 116 with an annular valve face 117 and a central channel 115. An annular seal 114 attaches to the valve face 117 and is secured by a seal retainer 118. The valve body 116 is biased upwardly by spring 120 and is sized to slidably engage a valve guide 122. The valve body 116 is sealed with two O-rings, a first O-ring 124 disposed between the valve guide 122 and the valve body 116, and a second O-ring 126 disposed between the valve guide 122 and a housing wall (not shown). Retainer clip 128 secures the valve guide in the housing (see FIG. 7). A U-shaped retainer 130 is attached to the interior of the common vent port 26, to retain a vent flap 132 that allows exhaust air to exit the module through the common vent port 26 and shields the port from contaminants.

The check valve 99, also shown in FIG. 4, includes a spring seat 102 positioned inside the system-pressure air supply port 216. A check valve spring 104 abuts the spring seat 102 and a check valve insert 106 is positioned between the check valve spring 104 and a valve member 108. A check valve fitting 112 has external threads that threadably attach to the system-pressure air supply port 216 and, cooperatively with a check valve O-ring 110, substantially closes the system-pressure air supply port 216 when the valve member 108 abuts the fitting 112. The check valve fitting 112 also has internal threads for attachment of the pressurized air supply line 214 (FIG. 1).

Figure 5:
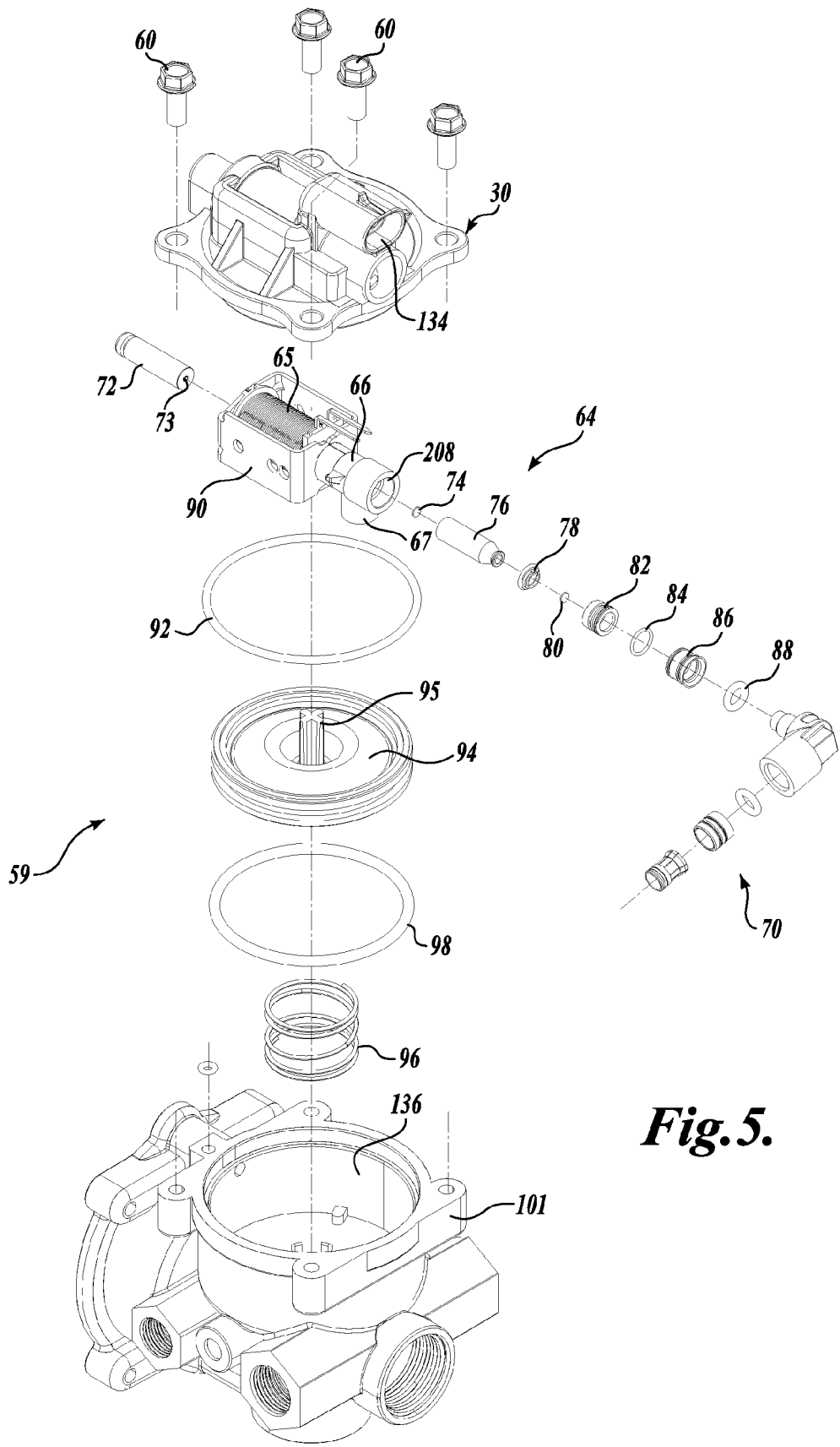
FIG. 5 is a partial exploded view of the first relay valve assembly of the lift axle control module according to one embodiment of the present disclosure.
Figure 8:
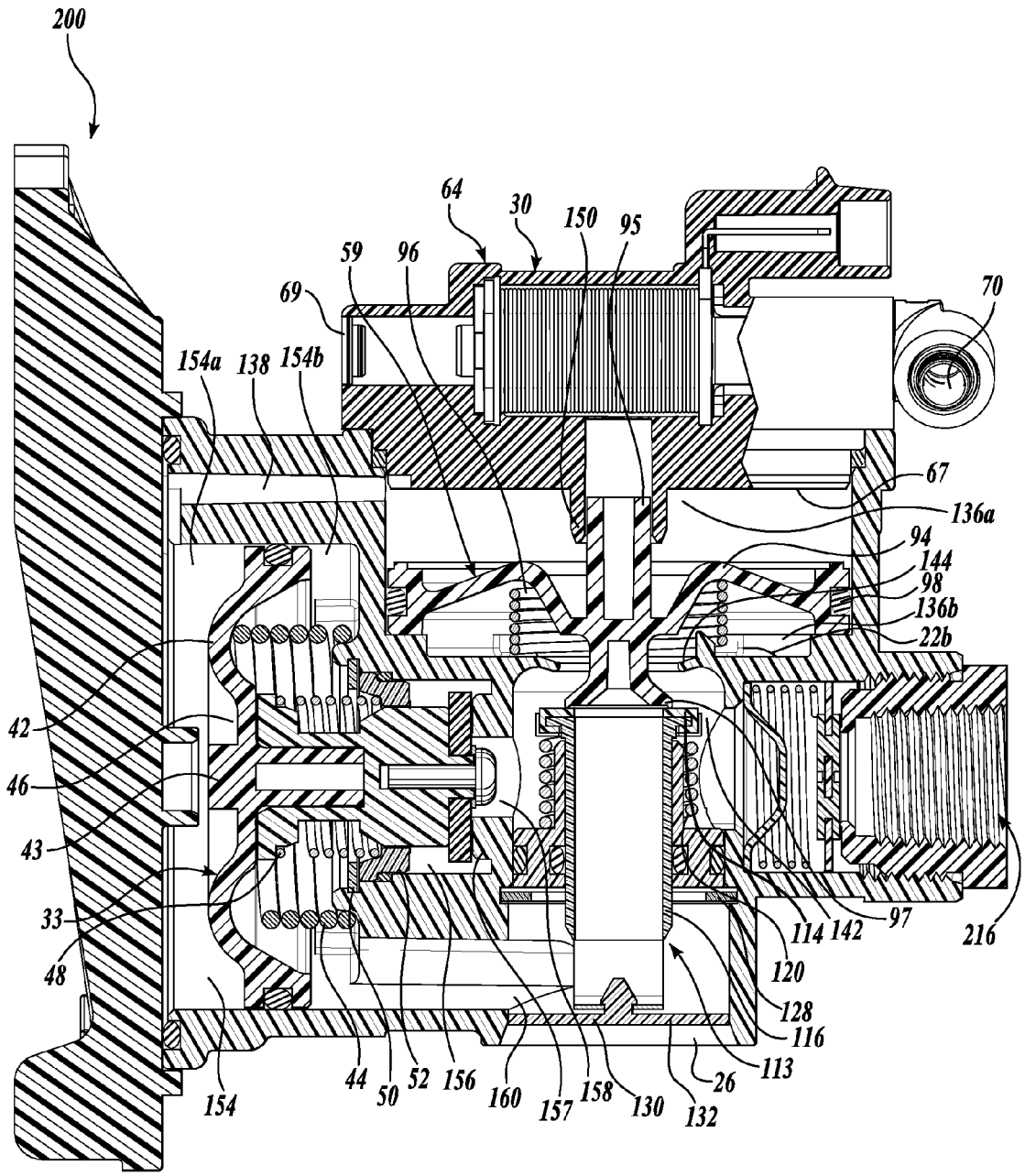
FIG. 8 is a cross sectional view of the lift axle control module with the load bladders inflating according to one embodiment of the present disclosure.

FIG. 5 is a partial exploded view showing details of a first relay valve assembly 59. The first relay valve assembly 59 includes a brake-style diaphragm comprising a piston 95 with an attached circular membrane 94, a combination sometimes called a membrane piston. As seen most clearly in the cross-sectional view of FIG. 8, the base of piston 95 has a meeting surface 97 that acts to unseat the inlet valve 113 described above. The meeting surface 97 of piston 95 sealingly seats against the annular seal 114, closing the valve body central channel 115 when the piston 95 unseats the inlet valve 113. Referring still to FIGS. 5 and 8, a spring 96 biases the piston 95 upwardly. The membrane 94 is provided with a peripheral seal member, O-ring 98, that slidably engages the sidewalls of a first piston chamber 136.

The solenoid cover 30 is removably attached to the module housing 101 with bolts 60. The cover 30 and housing 101 are substantially sealed with O-ring 92. The cover 30 includes an electrical receptor 134 that is adapted to connect to the switch 212 (see FIG. 1). A solenoid valve assembly 64 is housed in a compartment in the solenoid cover 30. The solenoid valve assembly 64 has a tubular bobbin 66 and a flux path conductor 90. The bobbin 66 has a control air port 67, a regulated air supply port 208, and a vent port 69 (not visible in FIG. 5). A coil winding 65 is wound about the bobbin 66. A fitting 70 engages the regulated air supply port 208. The solenoid valve assembly 64 also has a magnetic pole piece 72 disposed within one end of the tubular bobbin 66. The pole piece 72 has an axial aperture 73 that allows air to vent from the first piston chamber 136 when the solenoid is non-energized and which is substantially closed when the solenoid is energized, as described in more detail below.

An armature 76 is slidably disposed within the tubular bobbin 66 between the pole piece 72 and a valve seat 82 that is pressed into the bobbin 66. A spring 78, for example a coil spring, biases the armature 76 toward the valve seat 82. When the coil 65 is not energized, the slideable armature 76 is urged by the spring toward the valve seat 82, and when the coil 65 is energized, the armature 76 is magnetically urged toward the pole piece 72. The armature 76 preferably includes elastomeric seal members 74, 80 on each end, to facilitate sealing engagement with the valve seat 82 or pole piece 72. A fitting 86 is disposed within the regulated air supply port 208 and, cooperatively with O-rings 84 and 88, receives the fitting 70 and seals the connection between the bobbin 66 and the fitting 70.

In the desired operation, when the coil 65 is not energized, the armature 76 is urged towards the valve seat 82 whereby the regulated air supply port 208 is closed and the pole piece axial aperture 73 is opened. Air may flow from the piston chamber 136 through axial aperture 73 to the atmosphere. When the coil 65 is energized, the armature 76 is urged toward the pole piece 72, wherein the regulated air supply port 208 is opened so that air may flow through the regulated air supply port 208 and the control air port 67 into the first piston chamber 136. The axial aperture 73 is simultaneously closed by the seal member 74 covering the aperture 73.

Although the disclosed lift axle control module 200 is shown with an integral solenoid valve assembly 64 for completeness, and to illustrate a configuration that is currently preferred for some applications, it will be readily apparent to persons of skill in the art that the present invention may alternatively be implemented utilizing a separate solenoid valve, or other switching mechanism, to selectively provide the regulated air supply to the control module using conventional components, as are well-known in the art.

Figure 6:
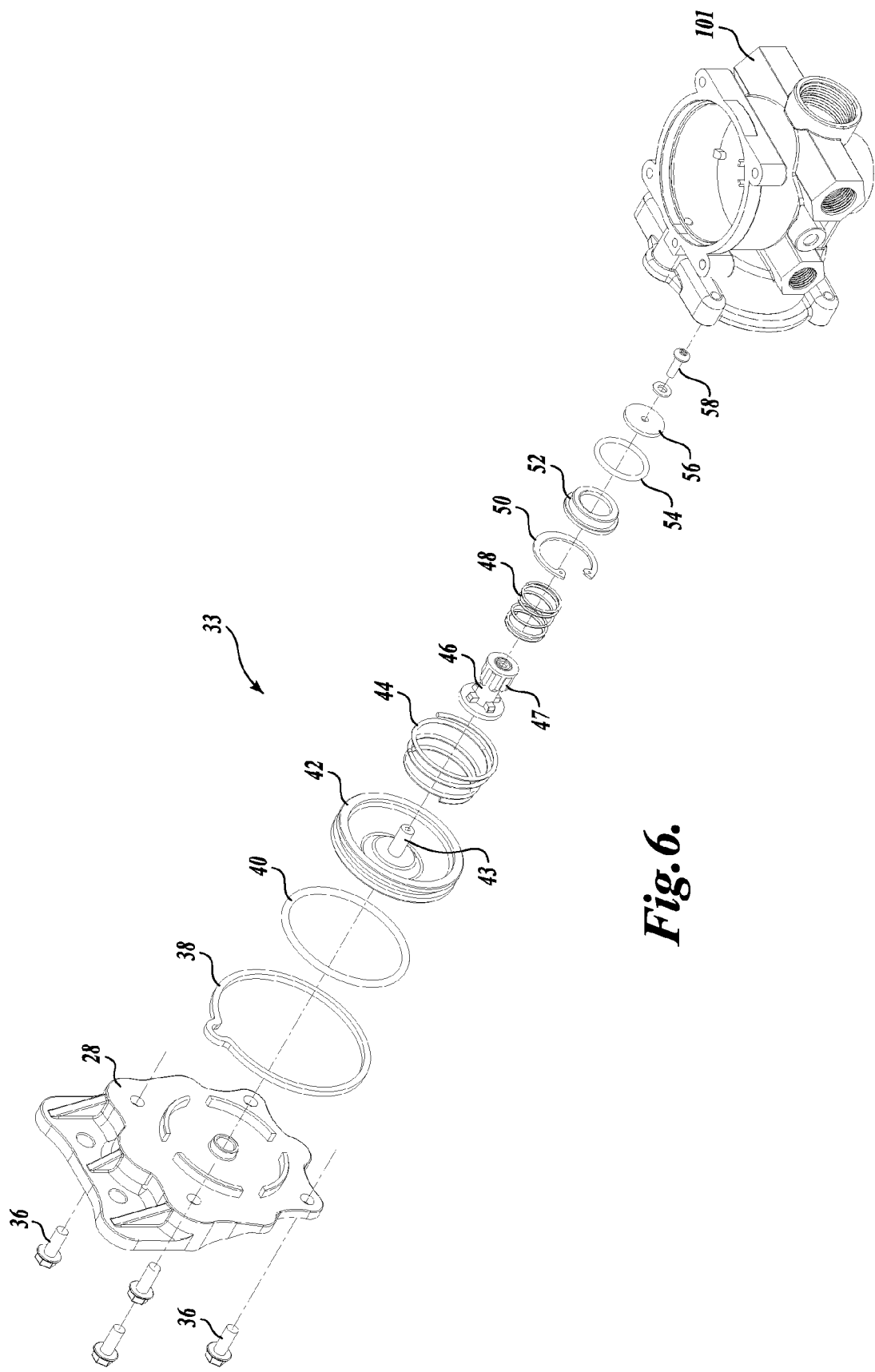
FIG. 6 is a partial exploded view of the second relay valve assembly of the lift axle control module according to one embodiment of the present disclosure.

FIG. 6 is a partially exploded view of a second relay valve assembly 33. The relay valve assembly 33 has a piston 43 with an attached circular membrane 42 and a peripheral O-ring 40, similar to the membrane piston described above. The second relay valve assembly 33 also has a double-seated shut off valve having a valve body 46 with a plurality of longitudinal channels 47. The piston 43 is inserted into a central aperture of a first end of the valve body 46. A second end of the valve body 46 extends through an annular valve seat 52 that is retained in the housing 101 by a retainer clip 50 (see FIG. 8). An O-ring 54 encircles the valve seat 52 and a screw 58 fastens a valve base 56 into the second end of the valve body 46. A larger diameter spring 44 biases the membrane piston 42, 43 outwardly. A smaller diameter spring 48 biases the valve body 46 toward the membrane piston 42, 43. The second relay valve assembly 33 is secured to the housing 101 by the mounting bracket 28 and bolts 36, and is sealed with seal member 38.

Figure 7:
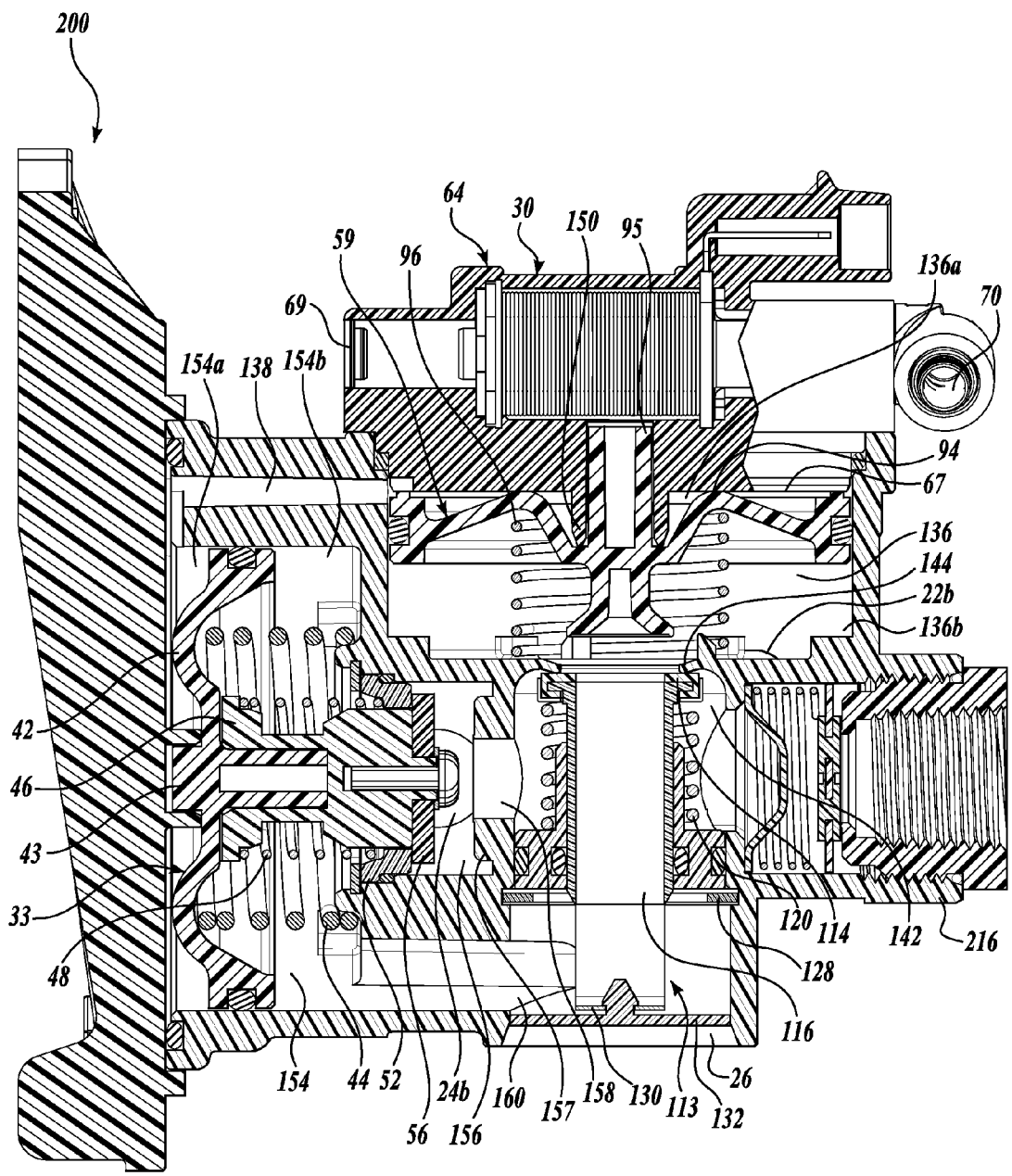
FIG. 7 is a cross sectional view of the lift axle control module in a non-energized state according to one embodiment of the present disclosure.

FIG. 7 is a cross-sectional view of the module 200 shown in the retracted mode, i.e., set for non-deployment of the lift axle assembly. The housing 101 defines generally cylindrical first and second piston chambers 136, 154 oriented perpendicular to each other. The first relay valve assembly 59, which controls the inflation and deflation of the load bladders 18a, 18b, is disposed substantially in the first piston chamber 136 and extends into a supply chamber 142 located below the first piston chamber 136. The second relay valve assembly 33, which controls the inflation and deflation of the lift bladders 20a, 20b is disposed generally within the second piston chamber 154.

Membrane 94 effectively divides the first piston chamber 136 into two sides: a regulated air side 136a and a load bladder port side 136b. The regulated air side 136a is fluidly open to the control air port 67 while the load bladder port side 136b is in fluid communication with the load bladder ports 22a, 22b (22b is partially visible in FIGS. 7-9), which connect to the load bladders 18a, 18b. The load bladder port side of the first piston chamber 136b has an end wall having an integral radial flange 144 defining an aperture creating a fluid passageway between the load bladder port side of the first piston chamber 136b and the supply chamber 142 when the inlet valve body 116 is pushed downwardly by the piston 95. The radial flange 144 serves as a valve seat against which the annular seal 114 rests when the inlet valve 113 is closed. The cover 30 has a downwardly extending piston guide 150 which receives the upper portion of the first relay valve piston 95.

The second piston chamber 154 has a large subchamber that is divided by the membrane 42 into a pilot signal, or regulated air, side 154a and a lift bladder port side 154b. The second piston chamber 154 also has a small sub-chamber 156 into which the valve body 46 extends. The small sub-chamber 156 is in fluid communication with the lift bladder ports 24a, 24a (24a is partially visible in FIG. 7) and has an aperture 158 formed by a housing annular flange 157. The aperture 158 fluidly connects the supply chamber 142 and the small sub-chamber 156. A wall on the lift bladder port side of the second piston chamber 154 defines a valve seat 52. The valve base 56 meets the valve seat 52 to form a seal, thereby blocking flow of pressurized supply air to the lift bladder ports 24a, 24a when the valve is in the non-energized position shown in FIG. 7. A channel 138 fluidly connects the regulated air side of first piston chamber 136a with the regulated air side 154a of the second piston chamber 154.

Operation of the lift axle control module will now be described in reference to all the drawings and, in particular, FIGS. 7-9. When the lift axle control module 200 is set to raise the lift axle, in the depicted embodiment the solenoid assembly 64 is non-energized, the load bladders 18a, 18b are vented and the lift bladders 20a, 20b are inflated so the lift axle is retracted (see FIG. 1). The regulated air sides of the first and second piston chambers 136, 154 are vented through the control air port 67 and vent port 69. The spring 48 biases the double-seated shut off valve body 46 toward a closed position wherein the shut off valve assembly 33 closes the air flow path between the lift bladder ports 24a, 24a and the vent port 69. In this closed position the small sub-chamber 156 of the second piston chamber 154 is in fluid communication with the supply chamber 142. Air entering the module 200 through the system-pressure air supply port 216 pressurizes the supply chamber 142 to the lift bladder ports 24a, 24a and inflates the lift bladders 20a, 20b generally to the vehicle system pressure from the air tank 204 (FIG. 1).

The first membrane piston 95 is biased upwards by the spring 96, such that the inlet valve 113 remains seated. Therefore, a flow path is opened between the load bladder ports 22a, 22b through the central channel of the inlet valve body 116 to the common vent port 26 and out to the atmosphere, and load bladders 18a, 18b are vented.

In this example, when the module is switched to deploy the lift axle, the solenoid assembly 64 is energized such that the armature 76 is urged toward the pole piece 72, closing the axial aperture 73, opening the regulated air supply port. When the lift axle is deployed, it is desirable to maintain the load bladders 18a, 18b at a selected regulated pressure to provide the desired suspension characteristics. A novel aspect of the lift axle control module 200 is that it operates to automatically maintain a desired load pressure by operating in two modes, shown in FIGS. 8 and 9.

In the first mode, called the load bladder inflation mode (shown in FIG. 8), when the load bladders 18a, 18b are not at the desired pressure, they are fluidly connected to the air tank 204 at system pressure. In the second mode, the steady state mode (shown in FIG. 9), when the load bladders 18a, 18b are at the desired pressure, the fluid connection to the system pressure is closed, as described in more detail below.

When the solenoid valve is energized, the lift axle is deployed by deflation of the lift bladders 20a, 20b and inflation of the load bladders 18a, 18b (see FIG. 1). Referring now also to FIG. 8, an air flow path is opened from the regulated air supply port 208 through the control air port 67 to pressurize the regulated air side 136a of the first piston chamber 136 and through the channel 138, pressurizing the regulated air side 154a of the second piston chamber 154. Thus, the regulated air sides of the first and second piston chambers are pressurized. This pressure increase urges the first membrane piston 95 against the opposing force of the spring 96. The membrane piston 95 meeting surface 97 contacts valve head 117 opening the inlet valve 113. Pressurized air enters the supply chamber 142 and pressurizes the load bladder side 136b of the first piston chamber 136, inflating the load bladders 18a, 18b through load bladder ports 22a, 22b (see FIG. 1).

The second membrane piston 43 is urged from left to right in FIG. 8, moving the shut off valve 46 to an open position, wherein the lift bladder ports 24a, 24a are vented. In particular, the second relay valve assembly 33 closes the housing radial flange 157, thereby sealing aperture 158, disconnecting the lift bladder ports 24a, 24a from the high-pressure air source. The shut off valve body 46 has longitudinal channels 47 (see FIG. 6), such that pressurized air from the lift bladders 20a, 20b is vented through the longitudinal channels 47, through to a passageway 160, to the common vent port 26.

Figure 9:
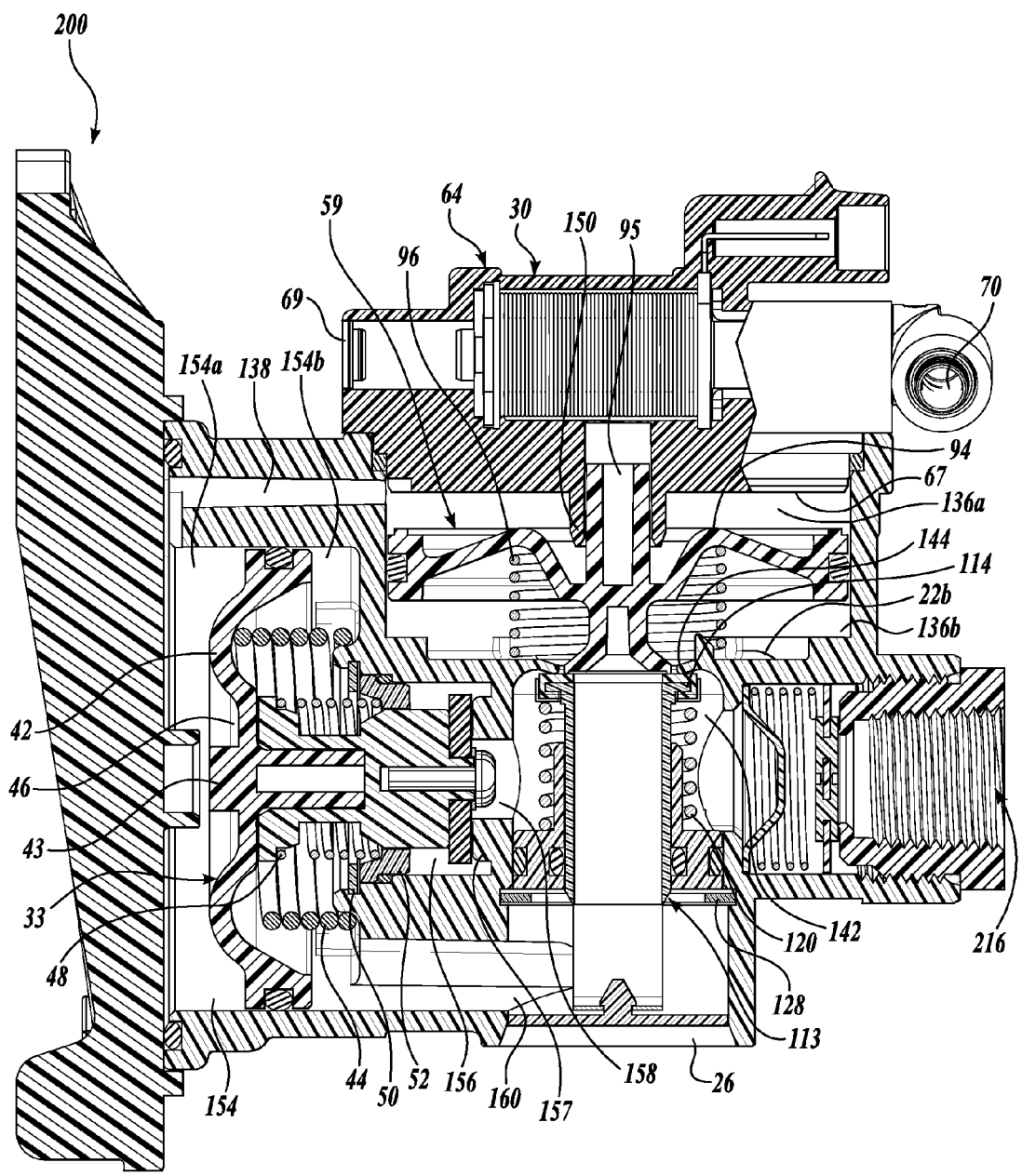
FIG. 9 is a cross sectional view of the lift axle control module with the load bladders at the design pressure according to one embodiment of the present disclosure.
Figure 10:
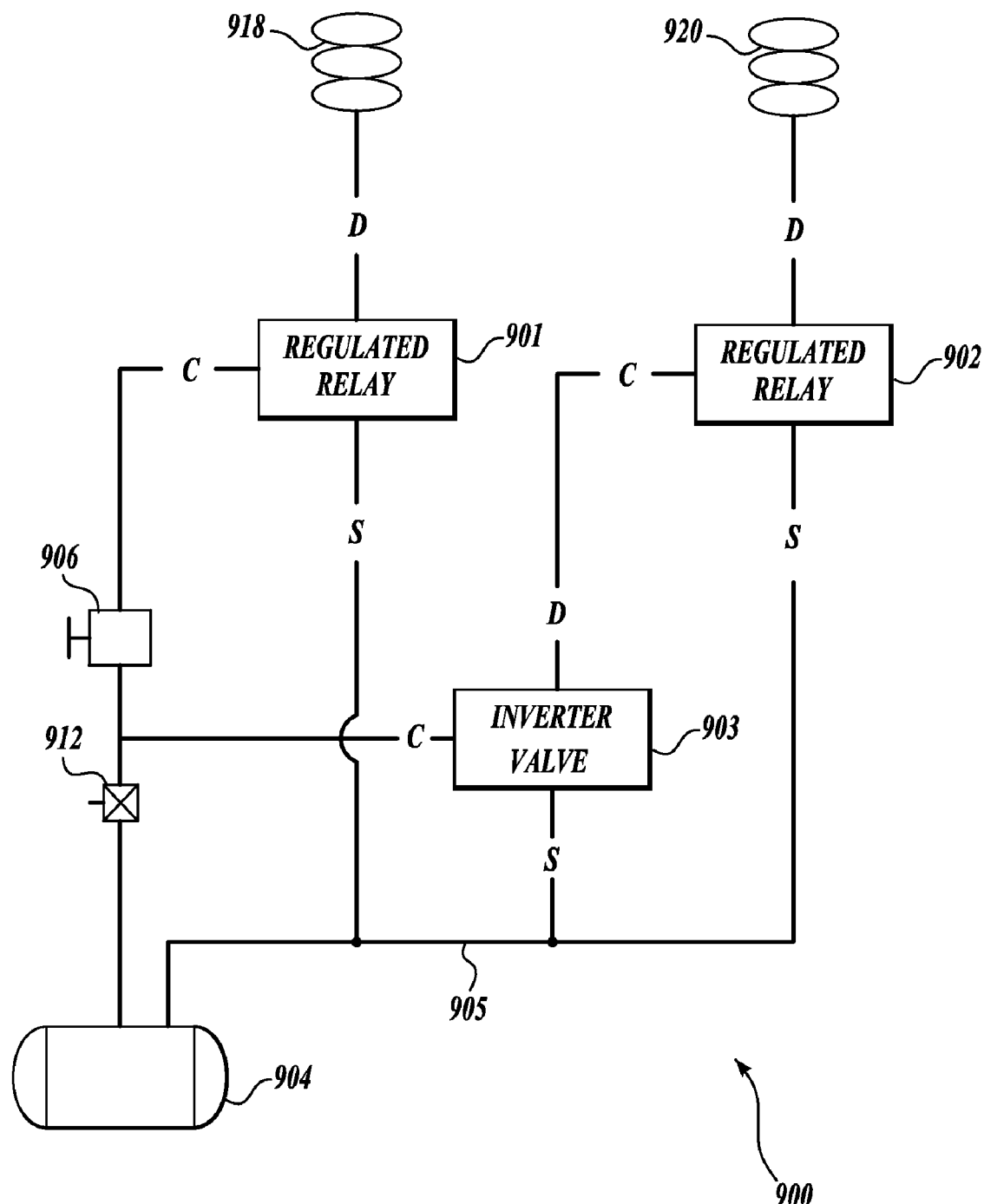
FIG. 10 is a schematic view of a prior art lift axle control system.

In the second steady-state mode, shown in FIG. 9, the solenoid assembly 64 remains energized when the lift axle is deployed and the load bladders 18a, 18b are inflated. In this mode, the module adjusts to ensure that the load bladders 18a, 18b are not overinflated. When the pressure in the load bladders 18a, 18b reaches the regulated pressure, the air pressure on either side of the membrane 94 is the same, and the force of the spring 96 moves the inlet valve 113 upwardly (in FIG. 9), to close the supply of high pressure air from the air tank 204, preventing the load bladders 18a, 18b from over-pressurizing. If the pressure in the load bladders 18a, 18b decreases to less than the regulated pressure, the inlet valve 113 will open again because of the pressure differential across the membrane 94. The inlet valve 113, therefore, continuously maintains the load bladders 18a, 18b at approximately the regulated pressure.

While illustrative embodiments have been illustrated and described, it will be appreciated that various changes can be made therein without departing from the spirit and scope of the invention.

The invention claimed is:

1. A lift axle control module for a vehicle having a pressurized air supply, a regulator providing a regulated air supply, a lift bladder and a load bladder, the lift axle control module comprising:

a housing having a first chamber with a load port connected to the load bladder, and a second chamber with a lift port connected to the lift bladder, the housing also having a supply port connected to the pressurized air supply and a control port selectively connected to the regulated air supply;

a first relay valve assembly in the first chamber that connects the load port to the supply port when the control port is connected to the regulated air supply, and vents the load port when the control port is not connected to the regulated air supply;

a second relay valve assembly in the second chamber that vents the lift port when the control port is connected to the regulated air supply, and connects the lift port to the supply port when the control port is not connected to the regulated air supply; and further comprising an inlet valve that closes the connection between the supply port and the load bladder when the pressure in the load bladder is greater than the pressure of the regulated air supply.

2. The lift axle control module of claim 1, wherein the first relay valve assembly comprises a first membrane piston that sealingly engages a peripheral wall of the first chamber.

3. The lift axle control module of claim 2, wherein the second relay valve assembly comprises a second membrane piston that sealingly engages a peripheral wall of the second chamber.

4. The lift axle control module of claim 3, wherein the second relay valve assembly further comprises a double-seated shut off valve.

5. The lift axle control module of claim 4, wherein the double-seated shut off valve includes a longitudinal channel, and further wherein the double-seated shut off valve is movable between an open position, wherein the lift bladder port is vented, and a closed position, wherein the lift bladder port is pressurized.

6. The lift axle control module of claim 3, further comprising a channel that fluidly connects the first chamber to the second chamber.

7. The lift axle control module of claim 1, further comprising an integral solenoid valve assembly having a first position that connects the regulated air supply to the control port and a second position that vents the control port.

8. The lift axle control module of claim 7, further comprising a remote switch that is operatively connected to the solenoid valve assembly that is adapted to switch the solenoid valve assembly between the first position and the second position.

9. The lift axle control module of claim 1, wherein the inlet valve comprises a tubular valve body having an annular valve face that is biased towards the first relay valve assembly.

10. The lift axle control module of claim 9, further comprises a valve guide having a central orifice that slidably engages the valve body, a first seal disposed between the valve body and the valve guide, and a second seal disposed between the valve guide and a housing wall.

11. A lift axle control system comprising:
a pressurized air supply;
a regulator providing a regulated air supply;
a lift bladder;
a load bladder;
a lift axle control module comprising:
i) a housing having a first chamber with a load port connected to the load bladder, and a second chamber with a lift port connected to the lift bladder, the housing also having a supply port connected to the pressurized air supply and a control port selectively connected to the regulated air supply;
ii) a first relay valve assembly in the first chamber that connects the load port to the supply port when the control port is connected to the regulated air supply, and which vents the load port when the control port is not connected to the regulated air supply;

iii) a second relay valve assembly in the second chamber that vents the lift port when the control port is connected to the regulated air supply, and which connects the lift port to the supply port when the control port is not connected to the regulated air supply; and iv) further comprising an inlet valve that closes the connection between the supply port and the load bladder when the pressure in the load bladder is greater than the pressure of the regulated air supply.

12. The lift axle control system of claim 11, further comprising a second lift bladder and a second load bladder.

13. The lift axle control system of claim 11, wherein the first relay valve assembly comprises a first membrane piston that sealingly engages a peripheral wall of the first chamber.

14. The lift axle control system of claim 13, wherein the second relay valve assembly comprises a second membrane piston that sealingly engages a peripheral wall of the second chamber.

15. The lift axle control system of claim 14, wherein the second relay valve assembly further comprises a double-seated shut off valve.

16. The lift axle control system of claim 15, wherein the double-seated shut off valve includes a longitudinal channel, and further wherein the double-seated shut off valve is movable between an open position wherein the lift bladder port is vented, and a closed position wherein the lift bladder port is pressurized.

17. The lift axle control system of claim 14, further comprising a channel that fluidly connects the first chamber to the second chamber.

18. The lift axle control system of claim 11, further comprising an integral solenoid valve assembly having a first position that connects the regulated air supply to the control port and a second position that vents the control port.

19. The lift axle control system of claim 11, wherein the inlet valve comprises a tubular valve body having an annular valve face that is biased towards the first relay valve assembly.

20. The lift axle control system of claim 19, further comprising a valve guide having a central orifice that slidably engages the valve body, a first seal disposed between valve body and the valve guide, and a second seal disposed between the valve guide and a housing wall.

* * * * *